(No Model.)
D. N. GLEASON.
CYCLE WHEEL.
No. 586,600.                    Patented July 20, 1897.
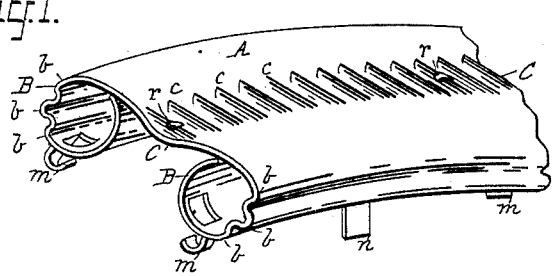
Fig. 1.
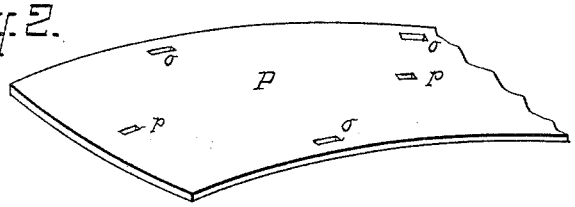
Fig. 2.
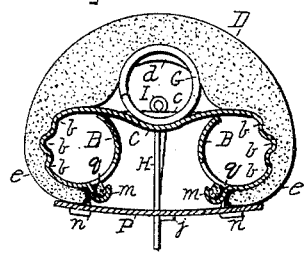
Fig. 3.
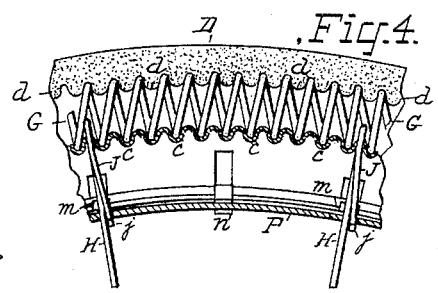
Fig. 4.
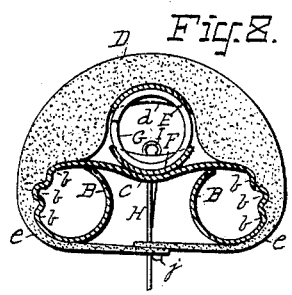
Fig. 8.
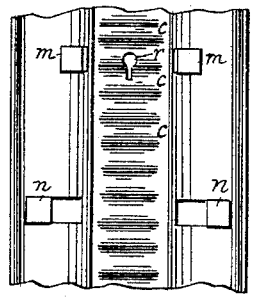
Fig. 5.
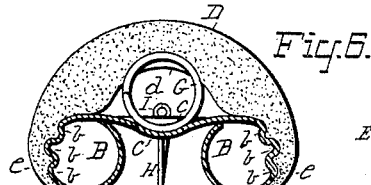
Fig. 6.
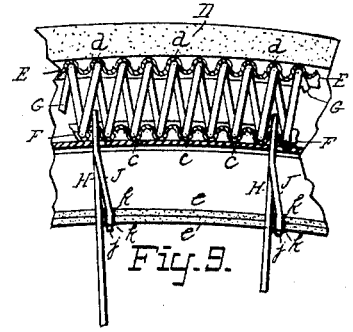
Fig. 9.
Fig. 7.
WITNESSES
INVENTOR
Duane N. Gleason
BY
Andrew Wilson
ATTORNEY

UNITED STATES PATENT OFFICE.

DUANE N. GLEASON, OF BROOKLYN, NEW YORK.

CYCLE-WHEEL.

SPECIFICATION forming part of Letters Patent No. 586,600, dated July 20, 1897.

Application filed August 11, 1896. Serial No. 602,391. (No model.)

*To all whom it may concern:*

Be it known that I, DUANE N. GLEASON, a citizen of the United States, residing at Brooklyn, Kings county, New York, have invented certain new and useful Improvements in Cycle-Wheels, of which the following is a specification.

The object of my invention is to produce a wheel which shall be light and strong and the tire of which shall possess a high degree of elasticity, resilience, and durability and which can readily be repaired when necessary. I secure these results by using a coiled-wire spring between the rim and the tire of the wheel and by using certain novel features of construction in the rim and tire, the particulars of which are hereinafter more fully set forth.

In the drawings, Figure 1 is a view of a section of the rim of my improved wheel. Fig. 2 is a section of the cover for the rim. Fig. 3 is a cross-sectional view, and Fig. 4 is a longitudinal sectional view, of the rim and tire. Fig. 5 is a view of the inner side of the rim. Fig. 6 is a cross-sectional view of a modification, and Fig. 7 is a bottom view of the same. Fig. 8 is a cross-sectional view of another modification, and Fig. 9 is a longitudinal sectional view of the same.

Similar parts are designated by like characters in all the figures.

The hub of the wheel may be made in any usual form, and for that reason I have not shown that part of the wheel.

A is a section of the rim. For clearness it is shown as cut straight across, but it will be understood that the completed rim is circular, like other rims of the class. This rim is made of thin metal, and the edges B B are bent or rolled inward and formed into the corrugations $b\ b\ b$, which serve to greatly increase the strength of the rim. The face of the rim is depressed centrally at C and is provided with the series of corrugations $c\ c\ c$. The spokes H H are looped at their outer ends I, which, by being given a half-turn, may be passed through the slots $r\ r$ and when released will remain fixed in the seats at the end of the slots. Around the rim I place the spring G, the coils of which correspond in number with the corrugations $c\ c\ c$ and fit therein.

D is the rubber tire, which is provided with the transverse ribs $d\ d\ d$, which enter between the coils of the spring G and serve, with the corrugations $c\ c\ c$ on the rim, to keep the coils of the spring properly distributed and to prevent crowding and buckling.

The sides $e\ e$ of the tire are carried around and inside of the rim A and are provided with eyelets $q\ q$, whereby they are hooked over the hooks $m\ m$, which are struck down from the metal of the rim. The tire is thus firmly attached to the rim and the spring is secured between the rim and tire, and the equal efficiency of its elasticity is secured by means of the corrugations $c\ c\ c$ and $d\ d\ d$. The tire being thus in place, I slide up the covering P, which is preferably made in sections and through the holes $p\ p$ of which the spokes have been passed before being attached to the rim. The ends J J of the spokes are drawn down through the holes $p\ p$ and bent over to form the hooks $j\ j$, and the lugs $n\ n$, struck down from the metal of the rim, are passed through the holes $o\ o$ in the cover and bent over, thus securing the cover firmly in place, preventing the gathering of mud or dirt within the rim and bracing the rim against lateral contraction or expansion.

The wheel thus constructed is light, but very strong. The transverse and longitudinal corrugations of the rim enable me to use light metal and yet secure great strength, the rubber-covered spring gives an even degree of elasticity, and the wheel is not liable to be disabled from any slight cause, such as a puncture in a pneumatic tire.

At Figs. 6 and 7 I have shown a modification wherein the tire is made wider, so that its edges $e\ e$ will overlap each other on the inside of the rim. They are slotted at 11, so as to pass the spokes, and are provided with eyelets $h\ h$, which are hooked over the ends $j\ j$ of the spoke-wires. This construction enables me to dispense with the cover P, if desired.

It will be understood that the overlapping edges of the tire may be further secured by being cemented together.

In Figs. 8 and 9 I have shown a further modification wherein the face of the rim is devoid of corrugations, as is also the interior of the tire, but a corrugated strip F is placed around the rim and another, E, between the tire and spring, being secured to the latter by fastenings, if desired. It will be seen that when repairs are required the rim, spring, and tire may be readily separated by simply loosening the various fastenings. The wheel can also be adapted to carry heavier or lighter weights by substituting springs of different degrees of strength, and this without placing any undue strain upon any part of the wheel, as is the case where an excessive pressure of air is used in pneumatic tires.

Having thus described my invention, what I claim, and desire to secure by Letters Patent of the United States, is—

1. The combination, in a cycle-wheel, of a metallic rim provided with corrugated edges, a series of tire-retaining hooks, and a series of lugs, both integral with said rim, a flexible tire attached to said hooks, and an interior cover secured by said lugs, substantially as and for the purposes described.

2. The combination, in a cycle-wheel, of a metallic rim provided with a circumferential groove and transverse corrugations, a series of tire-retaining hooks and a series of lugs, both integral with said rim, a flexible tire attached to said hooks, and an interior cover secured by said lugs, substantially as and for the purposes described.

3. The combination, in a cycle-wheel, of a metallic rim provided with a transversely-corrugated face, and longitudinally-corrugated edges, hooks formed integral with said rim, and an elastic tire surrounding the rim and retained by said hooks, substantially as described.

4. The combination, in a cycle-wheel, of a metallic rim provided with inwardly-rolled and longitudinally-corrugated edges, lugs formed integral with said rim, and an interior cover for said rim secured in place by said lugs, substantially as described.

5. The combination, in a cycle-wheel, of a metallic rim provided with a transversely-corrugated face and longitudinally-corrugated inwardly-projecting edges, and a cover detachably attached to the inner side of the rim, substantially as described.

6. The combination, in a cycle-wheel, of a metallic rim, provided with a transversely-corrugated face and longitudinally-corrugated inwardly-projecting edges, a flexible tire surrounding said rim and overlapping the edges thereof, and a cover detachably attached within the rim and overlapping the edges of the tire, substantially as described.

7. The combination, in a cycle-wheel, of a metallic rim, wire spokes projecting through and looped outside of the rim, the free ends of the spoke-wires extending inward, and an interior cover for said rim secured in place by the free ends of said spoke-wires, substantially as described.

8. The combination, in a cycle-wheel, of a metallic rim, provided with slotted spoke-holes having at one end enlarged seats, wire spokes with looped ends adapted to be inserted through said holes and retained in said seats by the loops resting transversely above the seats, substantially as described.

9. The combination, in a cycle-wheel, of a metallic rim, provided with hooks and lugs integral therewith, a flexible tire surrounding said rim and secured to said hooks and an interior cover laterally overlapping the edges of the tire and secured to the rim by said lugs, substantially as described.

10. The combination, with the hub and spokes of a cycle-wheel, of a metallic rim, formed in a single piece, and provided with a circumferentially-grooved and transversely-corrugated face, and with tubular edges, substantially as described.

11. The combination, with the hub and spokes of a cycle-wheel, of a metallic rim, formed in a single piece and provided with a circumferentially-grooved and transversely-corrugated face and longitudinally-corrugated tubular edges, substantially as described.

12. The combination, in a cycle-wheel, of a metallic rim, formed in a single piece and provided with a circumferentially-grooved and transversely-corrugated face and longitudinally-corrugated tubular edges, a coiled spring surrounding the face of said rim, and a flexible tire embracing and uniting said spring and rim, substantially as described.

13. The combination, in a cycle-wheel, of a rim provided with a circumferentially-grooved and transversely-corrugated face, a coiled spring the loops whereof enter between such corrugations, and a flexible tire surrounding said spring, and securing the same to the rim substantially as described.

14. The combination, in a cycle-wheel, of a rim provided with a circumferentially-grooved and transversely-corrugated face, a coiled spring the loops whereof enter between such corrugations, and a flexible tire provided interiorly with transverse ribs, substantially as described.

DUANE N. GLEASON.

Witnesses:
PERCY D. ADAMS,
ADOLPH FELDBLUM.